United States Patent
Assa et al.

(10) Patent No.: US 6,295,505 B1
(45) Date of Patent: *Sep. 25, 2001

(54) METHOD OF FILTER GENERATION FOR SEISMIC MIGRATION USING REMEZ ALGORITHM

(75) Inventors: Steven Brent Assa, Austin; Jeffrey Mark Rutledge, Sugar Land, both of TX (US)

(73) Assignee: Schlumberger Technology Corporation, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,900

(22) Filed: Dec. 17, 1997

Related U.S. Application Data

(63) Continuation of application No. 08/371,054, filed on Jan. 10, 1995, now abandoned.

(51) Int. Cl.[7] .................................................. G06F 19/00
(52) U.S. Cl. .............................................................. 702/17
(58) Field of Search ................................. 702/17; 367/38, 367/43

(56) References Cited

U.S. PATENT DOCUMENTS 4,464,737 * 8/1984 Pann ........................................ 367/49

* cited by examiner

Primary Examiner—Donald E. McElheny, Jr.
(74) Attorney, Agent, or Firm—Danita J. M. Maseles; Pehr B. Jansson

(57) ABSTRACT

A method for efficiently and accurately producing filter coefficients for wavefield extrapolation which is particularly useful for migrating seismic data using a multiprocessor parallel computer as provided. In 3D seismic migration, the techniques have been developed for 3D processing using 1D extrapolation filters. The present invention uses a Remez-type approximation for developing such extrapolation filters which increases image quality or reduces processing time, or both. Additionally, the method provides an automated method for producing such extrapolation filters which is particularly useful in parallel seismic migration because of the large number of extrapolation filters which must be produced. The automated method of generating filters sets a frequency transition band where the amplitude is specified to be monotonically decreasing which insures stable filter design.

38 Claims, 9 Drawing Sheets

Microfiche Appendix Included
(2 Microfiche, 52 Pages)

$$\begin{matrix} -\frac{c}{8} & 0 & \frac{c}{4} & 0 & -\frac{c}{8} \\ 0 & \frac{1}{8} & \frac{1}{4} & \frac{1}{8} & 0 \\ \frac{c}{4} & \frac{1}{4} & -\frac{1+c}{4} & \frac{1}{4} & \frac{c}{4} \\ 0 & \frac{1}{8} & \frac{1}{4} & \frac{1}{8} & 0 \\ -\frac{c}{8} & 0 & \frac{c}{4} & 0 & -\frac{c}{8} \end{matrix}$$

FIGURE 7

METHOD OF FILTER GENERATION FOR SEISMIC MIGRATION USING REMEZ ALGORITHM

This is a continuation of U.S. patent application Ser. No. 08/371,054, filed Jan. 10, 1995, now abandoned.

MICROFICHE APPENDIX

Appendix 1 and Appendix 2 are on microfiche. There are a total of 52 frames on two microfiche included with this specification.

BACKGROUND OF THE INVENTION

The present invention relates to the field of seismic data processing. In particular, this invention relates to a method of efficiently and accurately producing the filter coefficients for wavefield extrapolation particularly useful for migrating seismic data using a multiprocessor parallel computer.

1. Seismic Acquisition

The Earth's subsurface can be imaged by a seismic survey, therefore, seismic data acquisition and processing are key components in geophysical exploration. In a seismic survey, elastic acoustic waves are generated by a source at the Earth's surface and the waves are radiated into the Earth's subsurface. For land seismic surveys, the usual source is dynamite or a seismic vibrator, while for a marine seismic survey the source is typically an airgun array.

As the waves radiate downward through the Earth's subsurface, they reflect and propagate upwards towards the surface whenever the subsurface medium changes. The upward reflections are detected by a number of receivers and the reflected data recorded and processed in order to image the subsurface. Interpretation of these acoustic images of the subsurface formation leads to the structural description of the subsurface geological features, such as faults, salt domes, anticlines, or other features indicative of hydrocarbon traps.

While two dimensional ("2D") seismic surveys have been conducted since the 1920's, three dimensional ("3D") seismic surveys have only recently become widely used. 3D surveys more accurately reflect the subsurface positions of the hydrocarbon traps, but are expensive and time consuming to acquire and process. For an offshore 3D data set covering a 20×20 km area, it costs about $3M dollars (1991 dollars) to acquire the data with another $1 M dollars for data processing to transform the raw data into usable images. Because the cost of such a seismic survey is considerably less than the cost of drilling an offshore oil well, 3D seismic surveys are often worth the investment.

Although 3D marine surveys vary widely in size (1,000 to 100,000 km$^2$), a typical marine survey might generate in excess of 40,000 data acquisition tapes. Data is accumulated at a staggering rate, about 1.5 million data samples every 10 seconds. A significant amount of time and money is spent in processing this enormous amount of data.

The result of the seismic survey is thus an enormous amount of raw data indicative of reflected signals which are a function of travel time, propagation, and reflection affects. The goal is to present the reflected amplitudes as a function of lateral position and depth.

2. Seismic Processing

A typical marine seismic survey goes through three distinct sequential stages—data acquisition, data processing, and data interpretation. Data processing is by far the most time consuming process of the three. The acquisition time for a medium to large 3D marine survey is in the order of two months. Data is acquired by survey vessels traversing an area of the ocean along a series of parallel lines. A vessel may tow a number of sources (usually airgun arrays) and a number of receiver strings called hydrophone streamers (of length up to 5 kilometers). Sources are fired at 5 to 10 second intervals and the reflected seismic waves measured by up to 1000 hydrophone groups in every streamer. The measurements are recorded digitally on magnetic tapes. In addition to seismic data, navigation information is also recorded for accurate positioning of the sources and receivers. The resulting digital data must then be rendered suitable for interpretation purposes by processing the data at an onshore processing center. The processing sequence can be divided into the following five processing steps.

1. Quality Control, filtering and deconvolution. This processing is applied on a trace basis to filter noise, sharpen the recorded response, suppress multiple echoes, and generally improve the signal-to-noise ratio. Most of these signal processing operations can be highly vectorized.
2. Velocity analyses for migration. This processing estimates the velocity of the subsurface formations from the recorded data by modeling the propagation of acoustic waves with estimated velocities and checking for signal coherence in the acquired data. It is similar to migration but is applied to a small section of the data cube.
3. D dip moveout correction and stacking. This processing step, generally the most input/output intensive part of the processing, (i) sums together several traces in order to eliminate redundancy and reduce the signal-to-noise ratio, (ii) corrects for time delays that occur when the reflected signal is recorded by successive hydrophones that are located increasingly farther away from the energy source, and (iii) positions and orients the stacked data in accordance with the navigation information. After this processing step, the data is referred to as stacked data. This step normally constitutes on the order of a 100 to 1 reduction in data volume.
4. Migration. This processing step, computationally the most intensive, relocates the position of reflected strata, that are recorded in time, to their correct position in depth.
5. Enhancement and filtering. This processing step is used to enhance the migrated data using digital Flitering techniques.

The stacking process (step 3) reduces the amount of data to what is essentially a three dimensional array of numbers (i.e. a data cube) representing amplitudes of reflected seismic waves recorded over a period of time (usually 8 seconds). Such data cubes can be large, for example, a medium size 3D survey may produce cubes as large as 1000×1000×2000 of floating-point numbers.

The stacked data cube represents a surface recording of acoustic echoes returned from the earth interior and is not usually directly interpretable. The migration (or acoustic imaging process, step 4) is used to convert stacked data into an image or a map which can then be viewed as a true depth map cut out of the survey area.

Thus, migration is one of the most critical and most time consuming components in seismic processing is migration. Generally speaking, migration transforms the seismic data recorded as a function of time into data positioned as a function of depth using preliminary knowledge of the propagation velocities of the subsurface. In particular, migration moves dipping reflectors to their true subsurface position. Migration is typically performed on post stack seismic data to reduce the amount of processing time, but even so takes weeks of conventional supercomputer time for even medium size post stack seismic data cubes.

Most of the migration methods are based on the one way acoustic wave equation (compressional waves considered, shear waves ignored) using the exploding reflector model. In the exploding reflector model, stacked data are assumed to be recordings of a multitude of sources distributed along geological boundaries and exploded simultaneously. The post stack seismic data cube is considered to be recordings of upward traveling waves as they emerge from the Earth. (See generally, J. F. Claerbout, Imaging the Earth's Interior (1985), M. Dobrin & C. Savit, Geophysical Prospecting (1988), R. E. Sheriff, Geophysical Methods (1989), incorporated by reference for background).

3. Wavefield Extrapolation

Wavefield extrapolation is critical in the migration process. (The terms "wavefield extrapolation" and "downward continuation" are sometimes used interchangeably.) In wavefield extrapolation an imaging step is performed at each depth, which is the extraction of zero time amplitudes from the downward continued data cube. Wavefield extrapolation in the space-frequency (x,y,f) domain is preferable because it can more accurately image steeply dipping geological layers and certain mathematical operations are easier. In the space-frequency domain, the 2D scalar (two way) wave equation can be written as:

$$\frac{\partial}{\partial z}\begin{bmatrix} U \\ D \end{bmatrix} = \begin{bmatrix} -ik_2 & 0 \\ 0 & ik_2 \end{bmatrix}\begin{bmatrix} U \\ D \end{bmatrix} + r(k_z + Z)\begin{bmatrix} 1 & -1 \\ -1 & 1 \end{bmatrix}\begin{bmatrix} U \\ D \end{bmatrix}$$

wherein $k_2=(w^2/c^2-k_x^2)^{1/2}$, $U=U(w,k_x,z)$, $D=(w,k_x,z)$ represent the upgoing and downgoing waves respectively, w is the frequency (measured in radians per unit time), c is propagation velocity, and $k_x$ is the wavenumber (measured in radians per sample) in the x direction. $r(k_z,z)$ is the reflectivity function. This equation holds for a horizontal layered media. The first term in the equation accounts for the one way propagation of a wave in a homogeneous media. The second term accounts for transmission losses and coupling between the upgoing and downgoing waves at the interfaces. If transmission losses are neglected, the 2D scalar wave equation can be rewritten as:

$$\partial P/\partial z = \pm ik_z P$$

where P may be upward U or downward D. This is the basis for one way wave propagation such as using the exploding reflector model.

The analytical solution to this equation is:

$$P(w,k_x,z+\Delta z)=e^{\pm ik_z\Delta z}P(w,k_x,z)$$

corresponding to downward extrapolation of one way waves. This analytical solution can be approximated in the space-frequency domain with known finite difference techniques. These finite difference techniques resemble a 2D convolution when known techniques have been applied, collectively known as splitting or layer splitting. However, using conventional layer splitting techniques, computer accuracy or computer efficiency is sacrificed. It is useful to use a finite difference approximation in the space-frequency domain and recasts the problem as a filter. The Fourier transform approximates:

$$D(k) = e^{i\frac{\Delta z}{\Delta x}\left[\left(\frac{\omega\Delta z}{v}\right)^2 - k^2\right]^{\frac{1}{2}}} \quad (1)$$

where w denotes temporal frequency, v is the velocity, and z and x are vertical and horizontal spatial sampling intervals, and k is the wavenumber frequency. Wavefield extrapolation may be reduced to applying a filter with the characteristics of equation (1) independently to every frequency in the data cube.

Implicit filtering methods are widely used to extrapolate seismic wavefields in depth because of their stability. Such implicit methods for depth extrapolation do not permit the amplitude of the extrapolated wavefield to grow with depth. However, explicit filtering methods can be more easily implemented and are believed to be more efficiently executed on different computer architectures. In addition to simplicity, explicit methods are more readily extendable to 3D depth migration.

Because of the computational advantages of explicit methods, different methods have been proposed. O. Holberg, Towards Optimum One-way Wave Propagation, 306 *Geophysical Prospectizg* 99–114 (1988) generally discusses the wavefield extrapolation problem for depth migration, pre or post stack. Holberg reviews the various finite difference explicit methods for approximating the acoustic one-way equation in the space-frequency domain. Holberg then proposes a least-squares solution which minimizes the total phase and amplitude errors and their gradients for a range of propagation angles.

Building on Holberg's work, D. Hale Stable Explicit Depth Extrapolation of Seismic Wavefields, 56 Geophysics 1770 (1991), proposed a modified Taylor series expansion method for defining the coefficients to approximate the extrapolation filter of equation(1). Hale's modified Taylor series solution apparently yields a stable extrapolation filter approximation. Hale claims several advantages of the modified Taylor series method over the Holberg least-squares method. While the modified Taylor series method is stable, the phase error is increased. To reduce the phase error, Hale proposes increasing the number of coefficients in the extrapolation filter.

4. 3D Seismic Migration

Pieprzak and Highnam in U.S. patent application Ser. Nos. 07/811,414 (pending) and 07/811,565 (allowed) (incorporated by reference) describe accurate 3D one pass migration methods which employ the parallel features of a multiprocessor parallel computer to perform seismic migration. The 3D migration method employed by Pieprzak and Highnam. building on the work of G. Blacquiere, D. Hale, and J. McClellan, uses only the one dimensional extrapolation filters, so that the computational cost of 3D depth migration increases only linearly with N, the number of filter coefficients. The Pieprzak and Highnam migration method implements the use of a recursive Chebyshev filter structure for 2D convolution with radically symmetric operators using the 1D extrapolation filters. The method employed by Pieprzak and Highnam, both for time and depth, employs conventional wavefield extrapolation techniques, such as Holberg's least squares method, to compute the filter coefficients used in its two dimensional recursive filter approximation. The Pieprzak and Highnam migration runtime is totally dominated by the time necessary to apply these filter coefficients. Because of such extensive use, improvements in the accuracy of these filter coefficients increases the accuracy of the migration.

It is, therefore, an object of the present invention to provide an efficient method of approximating such wavefield extrapolation filter coefficients to increase computational efficiency, accuracy, or both. It is another object of the invention to automatically provide extrapolation filter coefficients for use in seismic migration. Still another object of the invention is to provide extrapolation filters useful for 3D seismic migration using a multiprocessor parallel computer.

In this application all references to patent documents are incorporated by reference and all references to non patent documents are incorporated by reference for background.

SUMMARY OF THE INVENTION

The problems outlined above are largely solved by the method of seismic migration in accordance with the present invention. The method employs a parallel computer having a number of processing components each with local memory where the seismic data is extrapolated in the frequency domain for all depths of interest. The method assigns processing components to respective subgrids in the (x,y) depth plane. A table of extrapolation filters is determined using a Remez-type approximation. The table is automatically generated and loaded into the local memory of each processing component assigned to the migration. The processing components are independently operated to extrapolate the seismic data for each (x,y) depth plane, with each processing component accessing its table in local memory using the lateral velocity assigned to a subgrid.

Preferably the table of filter coefficients is a one dimensional array indexed by lateral velocity variations. In the preferred embodiment, the index is the normalized frequency $$\frac{\omega \Delta x}{v}$$

where v is the velocity for the assigned subgrid. The seismic migration method is repeated to operate the processing components independently to extrapolate successive (x,y) depth planes. Preferably, some or all of the processing components in the multiprocessor parallel computer are assigned to the migration task and downwardly continues for each depth of interest through a single frequency plane. In the preferred method, at a given (x,y) depth plane, the processing components are assigned and operated independently through separate subgrids in the (x,y) depth plane.

The method of seismic wavefield depth extrapolation in accordance with the present invention approximates the 1D depth extrapolation operator D(k) with an ordinary Fourier cosine series having N coefficients $h_n$. The method first sets a desired maximum migration dip angle θ and desired N. Next, the wavefield extrapolation method computes a table of extrapolation filters $h_n$ for a range of normalized frequencies $$\frac{\omega \Delta x}{v}.$$

For each normalized frequency $$\frac{\omega \Delta x}{v},$$

the method sets a frequency transition band where the amplitude is monotonically decreasing in the transition band. The method extrapolates a seismic wavefield for a certain depth using the N filter coefficients $h_n$ from the table corresponding to the normalized frequency for the lateral region (i.e. subgrid).

BRIEF DESCRIPTION OF THE DRAWINGS

FIG. 5a is the ideal filter design and FIGS. 5b–d illustrate problematic filter designs;

FIG. 7 is a table illustrating the real constant 2D 5×5 convolution operator G.

DESCRIPTION OF THE PREFERRED EMBODIMENT

I Depth Extrapolation Filter 1.1 Overview of Application

Figure 1:
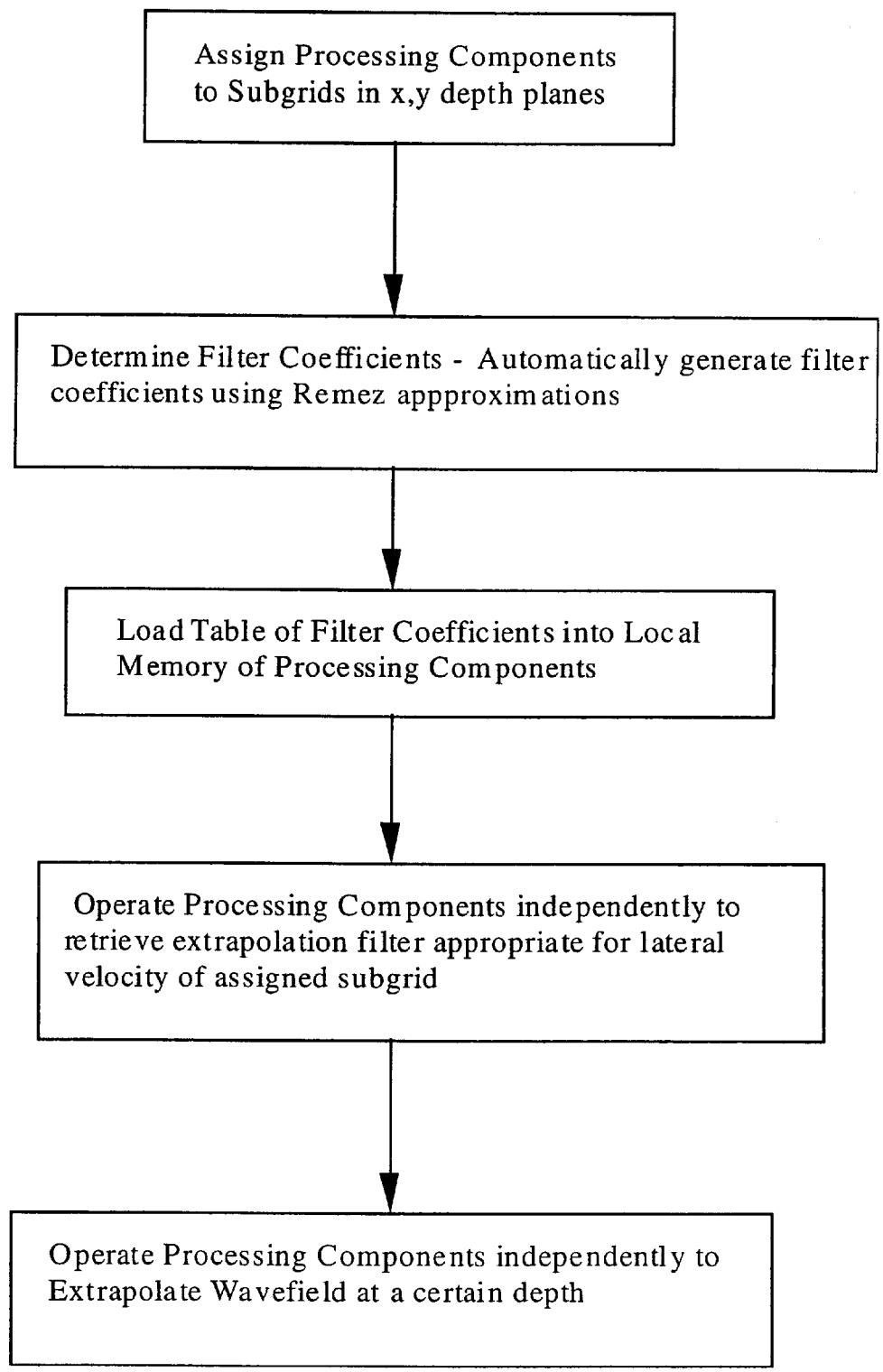
FIG. 1 is a flowchart illustrating the extrapolation steps in the seismic migration method of the present invention.

FIG. 1 conceptually illustrates the method of using the 1D extrapolation filter of the present invention. As can be seen, the processing components of the multiprocessor parallel computer are assigned to (x,y) spatial subgrids in a depth or depths of interest. In the preferred embodiment, the processor is assigned to the same spatial (x,y) subgrid in each depth to be migrated. Of course, not all processing components must be assigned to a migration task and several (or all) of the processing components that are assigned to the migration task may be assigned multiple subgrids within a particular depth plane. While varying the assignment of processing components to subgrids and trying the size of the subgrids is a viable alternative, the assignment overhead is not believed to be worthwhile in the preferred embodiment. Because multiprocessor parallel computer architectures vary, the present application uses the term "processing component" to include the possibility that each processing component might include one or several processors within the processing component and typically includes local memory, typically volatile memory.

Figure 4:
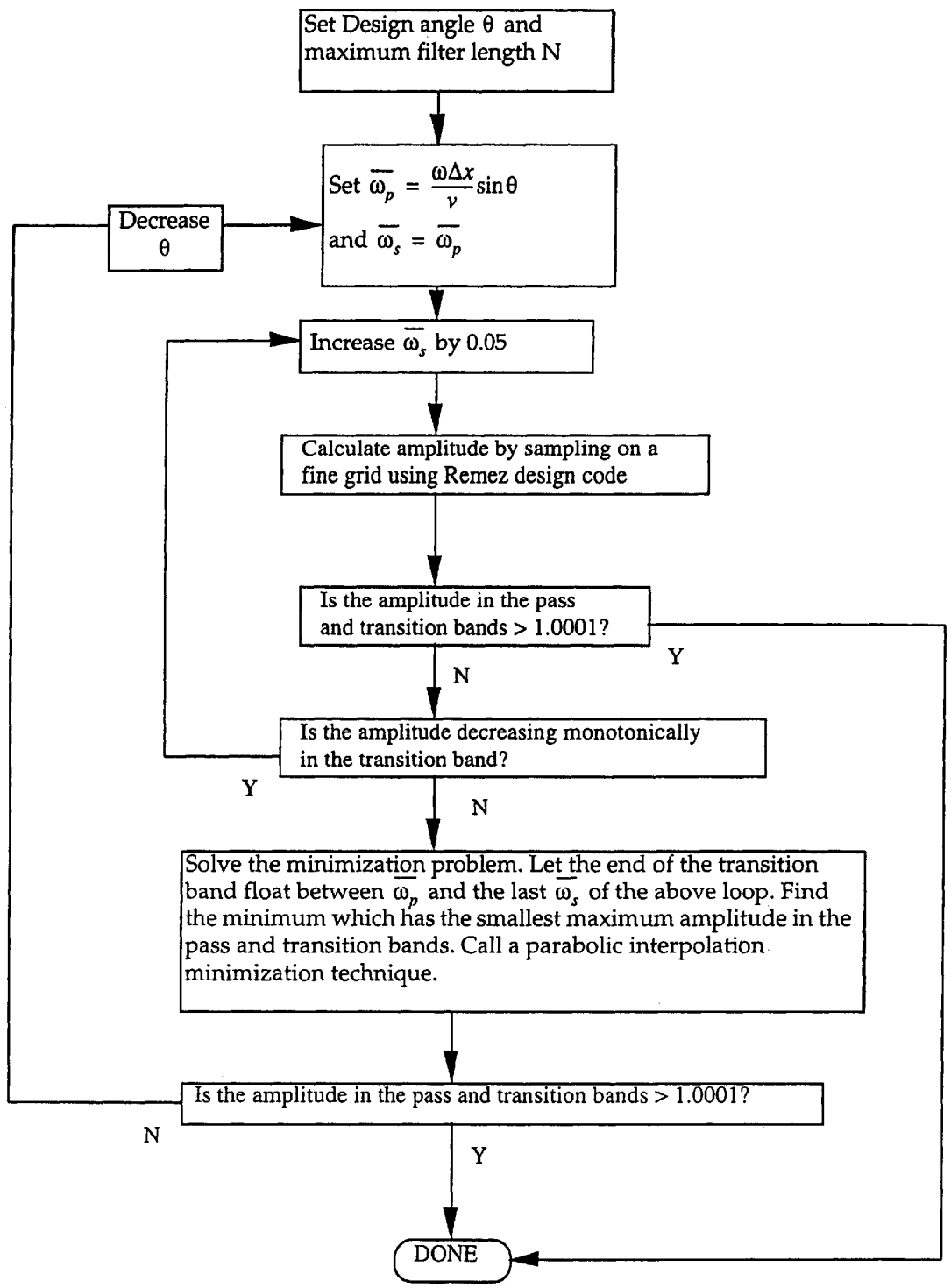
FIG. 4 is a flowchart illustrating the Remez-type filter design in accordance with the present invention.

Turning to FIG. 1. the method determines a table of filter coefficients where the set of filter coefficients vary according to lateral (x,y) velocity variations in the depth plane being imaged. The method approximates the extrapolation filters using a Remez-type approximation. FIG. 4 illustrates a flowchart describing the method of automatically generating such Remez-type filters in accordance with the present invention. In the preferred embodiment, the table of filter coefficients is used for all of the normalized frequencies in all depths of interest. As a variation, a single table may be computed for the frequency plane to be migrated and that table used for all depths of interest in that frequency plane.

As shown in FIG. 1, the table is loaded into the local memory of each processing component and the processing components are operated independently to extrapolate the seismic data for an (x,y) depth plane. That is, in the (x,y) depth plane currently being imaged, the processing components apply the extrapolation filter appropriate for the respective assigned subgrid. The appropriate extrapolation filter is accessed from the table based on the lateral velocity for the assigned subgrid and applied to each graduating. In the preferred embodiment, the table comprises a one dimensional array indexed by normalized frequency $$\frac{\omega \Delta x}{v}.$$

Figure 2:
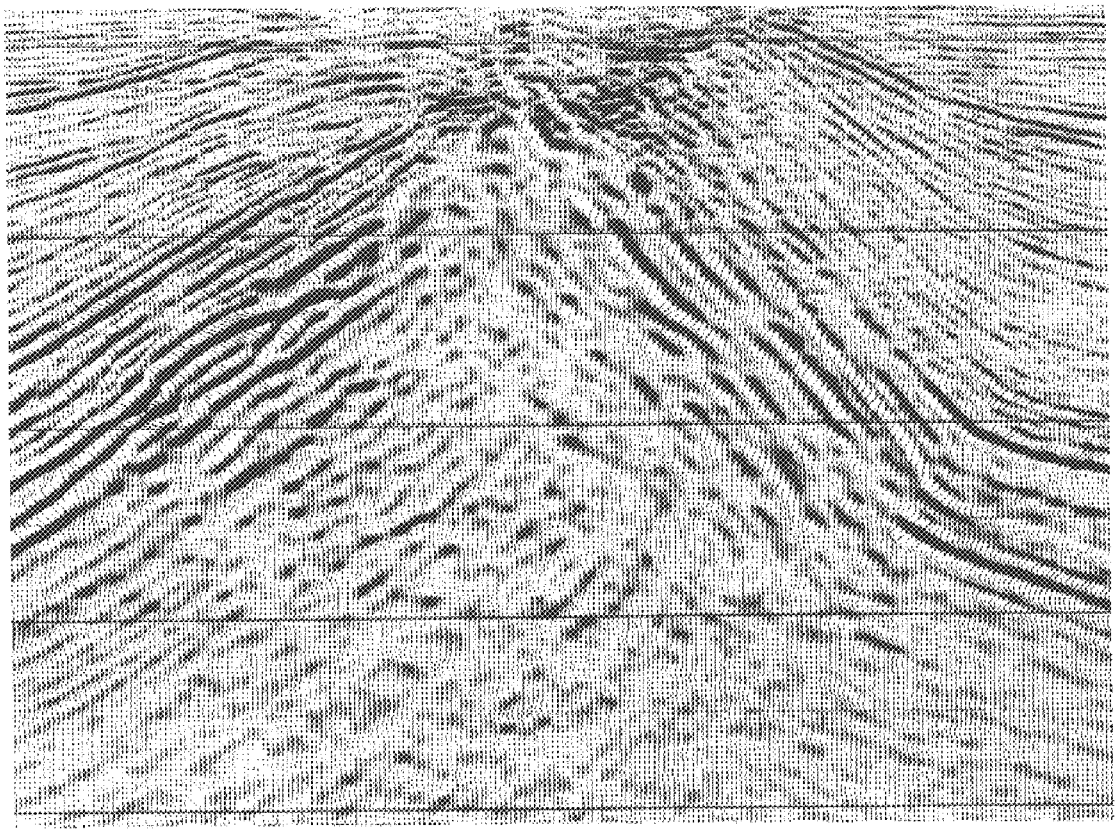
FIG. 2 is a depiction of a seismic section migrated in accordance with the least squares prior art method.
Figure 3:
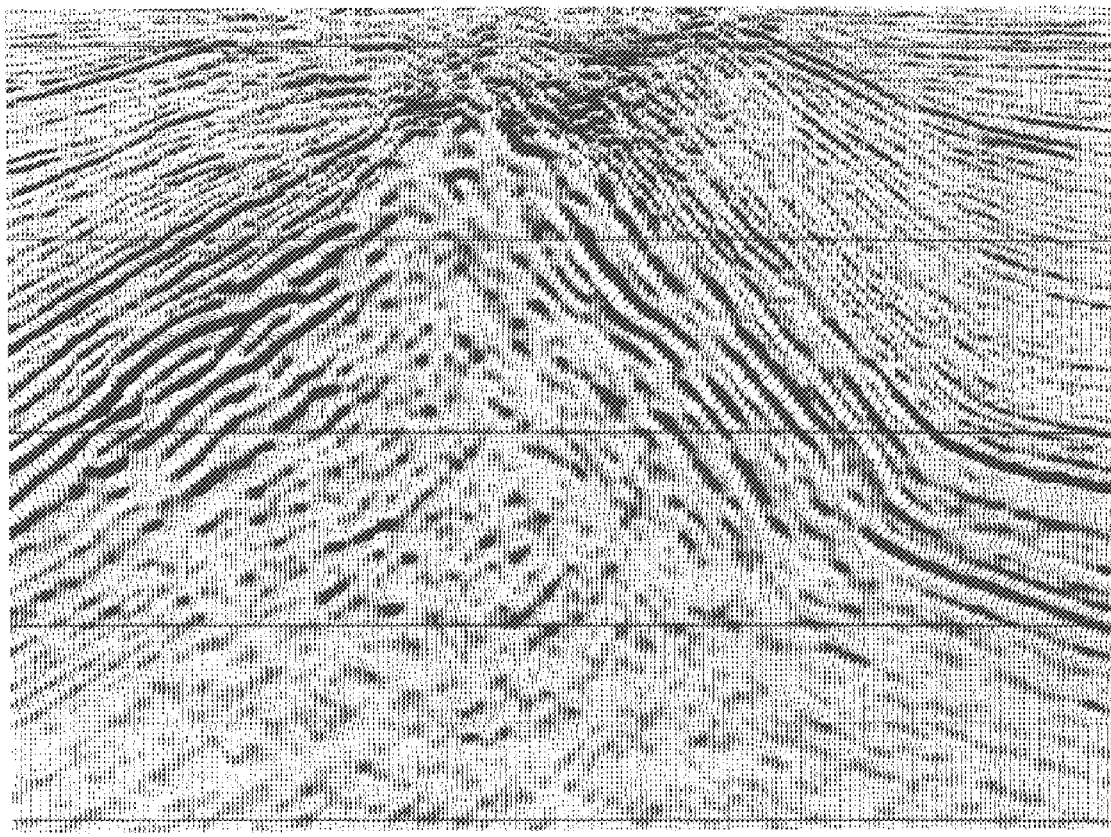
FIG. 3 is a seismic section migrated in accordance with the present invention.

FIGS. 2 and 3 are photographs of the same seismic section, where FIG. 2 illustrates the use of extrapolation filter coefficients computed by prior art methods. That is, the Holbera least squares method is used to compute the extrapolation filter coefficients used in the seismic migration of FIG. 2. In contrast, FIG. 3 shows the same seismic section migrated using the filter coefficients generated by the method of the present invention. As can be seen from a comparison of FIGS. 2 and 3, FIG. 3, shows finer detail of a number seismic horizons, and in particular provides a better image of steeply dipping events.

1.2 The 1D Extrapolation Filter Design Problem

As previously noted, the complex 1D depth extrapolation operator D(k) is defined by equation (1) as follows:

$$D(k) = e^{i\frac{\Delta z}{\Delta x}\left[\left(\frac{\omega \Delta z}{v}\right)^2 - k^2\right]^{\frac{1}{2}}} \quad (1)$$

where k denotes wavenumber frequency (radians per sample); $\Delta z$ is depth spacing; $\Delta x$ is in-line spacing; v is sound (half) velocity; and $\omega$ is temporal frequency (radians per unit time).

Several observations are useful. The depth spacing $\Delta z$ typically lies in the range of 4 to 15 meters, the in-line spacing $\Delta x$ is typically in the range of 10 to 25 meters, but depth spacing never exceeds the in-line spacing so that the ratio $\Delta z/\Delta x$ is always at most 1.5. Natural limitations to sound velocity and temporal frequency limits the effective range of $\omega \Delta x/v$ to the interval [0.015,20.00] radians. The wavenumber k is naturally defined in the interval [0, $\pi$]. Whenever k exceeds $\omega \Delta x/v$, the extrapolator D(k) is declared equal to zero. This is the so-called "evanescent" region and is typically discarded.

The goal is to approximate the extrapolator D(k) of equation (1) by an ordinary Fourier cosine series, $$F(k) = \sum_{n=0}^{N} h_n \cos(nk) \quad (2)$$

where the coefficients hn are complex numbers; k is the wavenumber frequency and lies in the interval [0, $\pi$], and N is the smallest possible integer. The acceptability of the approximation is judged by the stability and accuracy of the filter for those wavenumbers k less than or equal to $\omega \Delta x/v$. The desired accuracy and stability constraints for seismic migration forces the number of cosine terms N in equation (2) to become impossibly large, because F(k) is an infinitely differentiable function which has to approximate D(k) which has an infinite slope when k approaches $\omega \Delta x/v$. The standard compromise is to restrict the pass band wavenumber range below $\omega \Delta x/v$ by agreeing to image events whose dip angle is at most some pre-specified amount. Typically the maximum dip angle is in the range of 65 to 80 degrees. This amounts to saying that the passband upper limit is $\omega \Delta x/v$ $\sin\theta$. The filter approximation problem may be stated as follows: Given parameters N, $\Delta z$, $\Delta x$, $\omega$, V, design a cosine filter F(k) such that

| | |
|---|---|
| $F(\kappa) = D(\kappa)$ | k in [0, $(\omega \Delta x/v)\sin\theta$] |
| $\|F(\kappa)\| \leq \epsilon$ | in [$\tau,\pi$], $\epsilon<<1.0$ | where $\theta$ is the maximum dip angle ($\theta<90$) to be imaged and $\tau>\omega \Delta x/v \sin\theta$ is the lower limit on the stop band. [($\omega \Delta x/v$)$\sin\theta$, $\tau$] is the so-called filter transition zone. To prevent spatial aliasing $\epsilon$ should be on the order of 0.001.

1.3 The Solution to the Filter Design Problem

The method of the present invention adopts the general approach used by the IEEE utilizing the Remez exchange algorithm for approximating an FIR linear phase filter. The standard IEEE code (Program 5.1 in the IEEE Digital Signal Processing computer programs package) used to design Remez filters is not directly applicable however, because that code assumes the design function D(k) has linear phase and is real-valued. Equally important, known methods used to estimate the minimum number of cosine terms (the parameter N used in F(k)'s definition) needed to satisfy the migration's accuracy/stability constraints are meaningless in this case, since D(k) has a square root phase response.

These problems are overcome by modifying the IEEE design code and its use as follows:

The built-in linear phase response is replaced by D(k) and an externally settable switch is added so that the new response returns the real part or the imaginary part of the response.

The accuracy/stability application constraints are tightened and applied to separate designs of the real part and imaginary parts of F(k) so that when the two pieces are composed the overall design F(k) meets all constraints.

There is no a priori guarantee that the design process converges, especially since there is no known formula to guide order selection N in the non-linear phase case. (Indeed even in the linear phase case convergence is not guaranteed.) Should the design process fail, the method of the preferred embodiment relaxes the transition zone specification by increasing its size—equivalently decreasing the stop band [$\tau$, $\pi$].

Automation of the optimal transition point selection is made to guarantee that the amplitude is monotonically decreasing.

Alternatively, if N reaches some specified maximum limit, then the maximum dip design angle is lowered.

If this fails, then N may be increased to accommodate the tougher design.

1.4 Special Requirements of the 1D Depth Extrapolation Filter

Depth migration in the preferred embodiment may require literally millions of extrapolation filters. Memory limitations limit the ability to precompute and load such a large number of filter coefficients, so the migration process requires on demand (dynamic) filter design. Instead once the maximum dip angle is fixed the migration process loads into local memory a small number of extremely accurate extrapolation filters.

The wavenumber k is normalized such that any distance quantity is measured in terms of the number of horizontal sampling intervals $\Delta x$. With this normalization, two dimensional constants $$\frac{\Delta z}{\Delta x} \text{ and } \frac{\omega \Delta x}{v},$$

uniquely specify the desired transform D(k). Put another way, the desired transform D(k) can be expressed as:

$$D(k) = F\left(\frac{\Delta z}{\Delta x}, \frac{\omega \Delta x}{v}, k\right)$$

As first suggested by Holberg, a table of extrapolation filters can be made for a typical range of normalized frequencies $$\frac{\omega \Delta x}{v}.$$

In extrapolating from one depth to the next, the lateral velocity variations in the (x,y) plane are accommodated by letting the filter coefficients $h_n$ vary laterally as the value of the normalized frequency changes with velocity. That is, the lateral velocity variations in the (x,y) plane are expressed as a laterally varying extrapolator filter set.

In the preferred embodiment, it has been found that the first term $$\frac{\Delta z}{\Delta x}$$

is limited in range, typically 0.1 to 1, but it is a fixed value. Additionally, the normalized frequency or second term $$\frac{\omega \Delta x}{v}$$

typically falls in the range (0.10 to 8.00). Therefore, in the preferred embodiment, the first term $$\frac{\Delta z}{\Delta x}$$

is a constant and the second term, the normalized frequency $$\frac{\omega \Delta x}{v}$$

is a table of extrapolation filters.

As noted previously, different methods have been used for computing the N cosine coefficients $h_n$ for equation (2) to obtain the satisfactory approximation of the desired transform D(k), such as Holberg's "least squares" method. The least squares method tends to minimize the total energy error content over the entire wavenumber pass. Typically, the least squares filter design cuts back on the wavenumber pass band in order to meet the strict error conditions. The resulting extrapolated image shows the cut back as loss of detail and in certain cases omission of seismic events. The typical solution is to improve the filter response (i.e. increase the pass band) by increasing the filter length. However, because the computation time for the extrapolation used in the seismic migration method of the present invention is completely dominated by the time to apply these filters, the goal is to shorten rather than to lengthen the number N of extrapolation filter coefficients.

The filter design technique of the preferred embodiment utilizing a Remez approximation looks to keep the error distribution less than a fixed amount at every wavenumber frequency instead of minimizing the total error energy content over the entire wavenumber pass. Since the error tolerance of the migration method of the present invention is expressed as a fixed amount at every wavenumber frequency, this Remez approach has certain advantages. For the same filter size, the Remez approach of the preferred embodiment shows increased detail as compared to the least squares approach. Alternatively, the same level of detail can be made with the same filter length with a substantial reduction in processing time.

Given that migration requires literally millions of extrapolation filters, the preferred embodiment precomputes a small number of extremely accurate extrapolation filters and composes a lookup table indexed by the normalized frequency $$\frac{\omega \Delta x}{v}$$

where each parameter differs by one percent. Any extrapolation filter not explicitly defined in the table is approximated by linear interpolation between adjacent filters. The table is loaded into the local memory of the processing components of a parallel computer for quick local access resulting in faster execution.

The automated generation of accurate filter sets is important. Once the maximum dip angle θ is fixed, for a given normalized frequency $$\left(\frac{\omega \Delta x}{v}\right)$$

optimal filter design is made by defining the pass band (Wp), transition band (Ws), and stop band filter. In the preferred embodiment, to avoid poor filter results, the pass band and transition band are defined so that the maximum amplitude is less than 1.001. Similarly, the transition band amplitude is guaranteed to be monotonically decreasing. If the desired filter cannot be obtained using this method, the number of filter coefficients N is increased or the maximum dip angle θ is lowered.

II. Filter Design

Figure 5A:
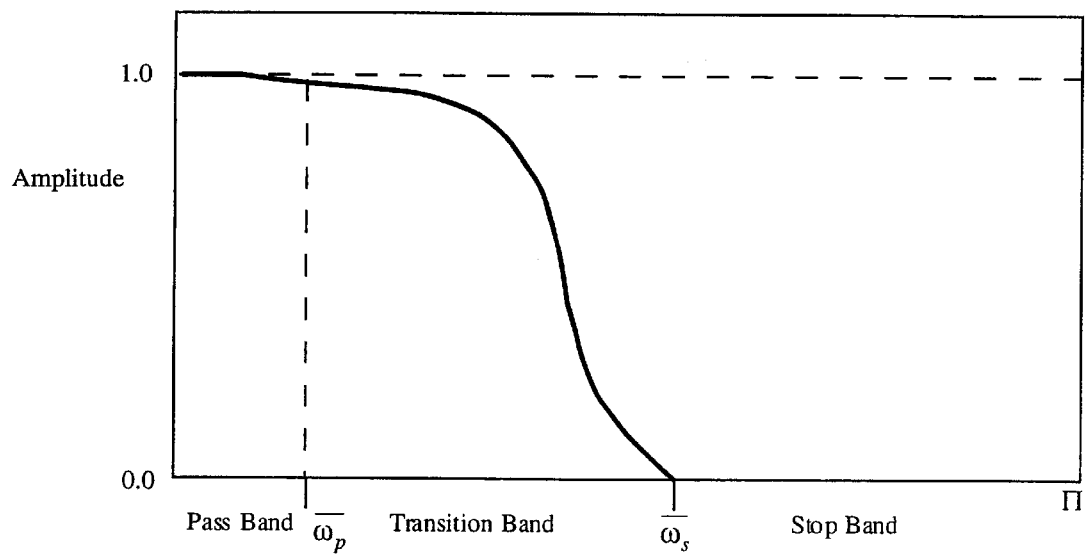
FIGS. 5a–d depicts the filter design problem where
Figure 5B:
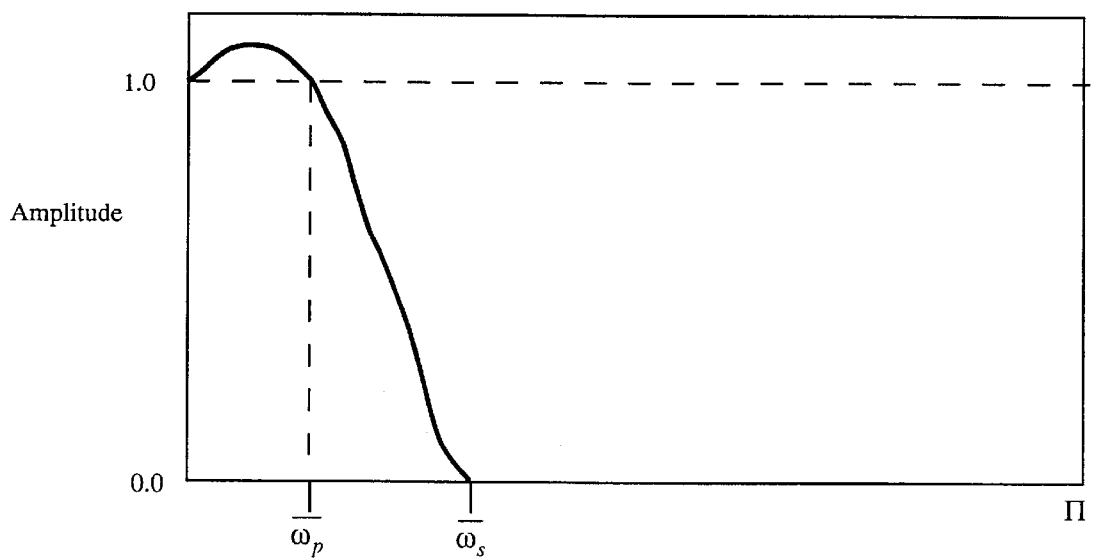
Figure 5C:
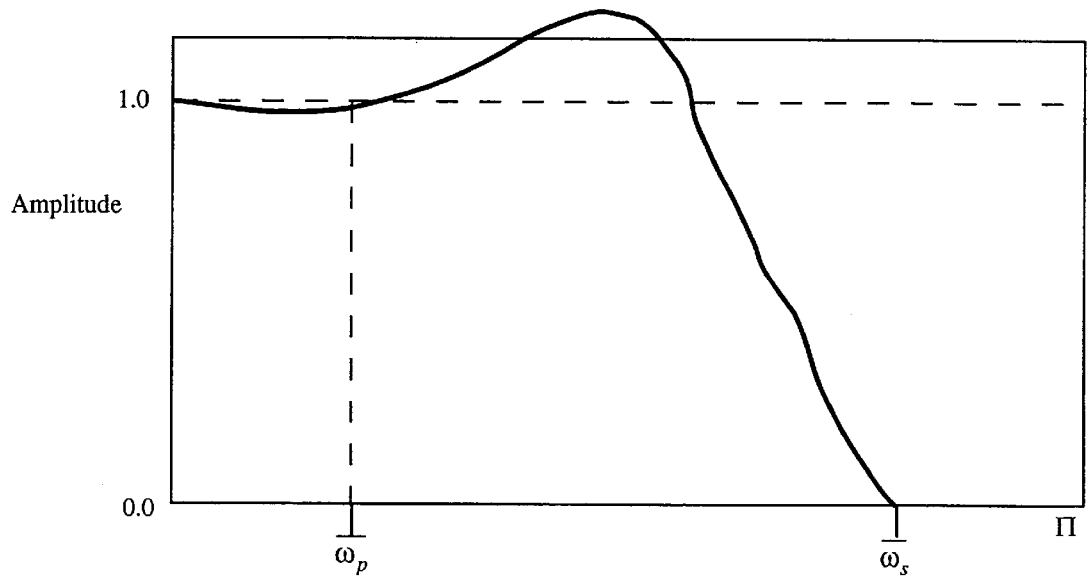
Figure 5D:
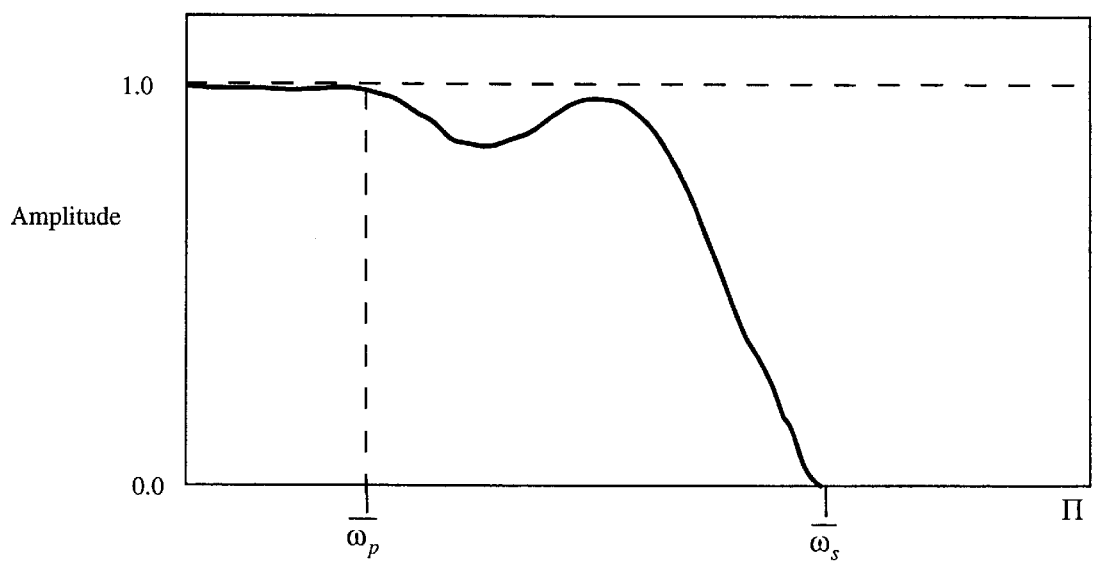

FIG. 4 illustrates the flowchart for the automated filter design for the preferred embodiment. To understand the basis for the automated filter design, it is useful to understand the filter problem. FIGS. 5a–d illustrate filter problems with FIG. 5a showing the desired ideal filter shape. FIG. 5b depicts a poor filter design where the transition band is too narrow causing unacceptable errors in the pass band. FIG. 5c shows a poor filter design where the transition band is too wide causing huge amplitude in the transition band. Finally, FIG. 5d shows a problem where the amplitude decay in the transition band is not monotonically decreasing. The problem with the filter designs in FIGS. 5b and 5c is that the filters are unstable. The filter in FIG. 5d produces an undesirable result.

To avoid the poor designs in FIGS. 5b and 5c, the preferred embodiment imposes a requirement that the maximum amplitude remain less that 1.001 and preferably less than 1.0001 in the pass band and transition bands. To avoid the poor filter design illustrated in FIG. 5d, the preferred embodiment requires that the amplitude in the transition band be monotonically decreasing.

The method of the preferred embodiment selects the transition zone width by posing a minimization problem. The minimization problem is to find the smallest amplitude deviation from unity on a finely sampled grid through the pass band transition zone by moving the location of the end of the transition zone between two points. One point is the pass band end point. The other point is chosen as the furthest point out from the end of the pass band where reasonable transition zone behavior can be guaranteed. (See e.g. FIG. 5a.) The criterion chosen for reasonable behavior in the transition zone is that the amplitude in the transition zone always be monotonically decreasing, or that the first derivative of the amplitude in the transition zone always be negative. Thus, a search is made by taking small steps in transition zone end point away from the pass band end point to where the first derivative changes sign in the transition zone, then a minimization algorithm is called to find the best amplitude overall error between those two points. A parabolic interpolation algorithm is used for the minimization technique because the overall best Remez fit is not usually at the point where the transition zone amplitude derivative changes sign, and a minimization routine can make a fine tuned selection using a variable step size.

The flowchart of FIG. 4 implements the filter design considerations. In the preferred design problem (for example), the maximum filter length N is 21 and if the process of FIG. 4 does not arrive at a suitable filter, N is increased to 31 coefficients. As can be seen from FIG. 4, if the filter design is still not satisfactory, the maximum dip angle $\theta$ is decreased.

III. Software Implementation

The design code subroutine of FIG. 4 which calculates the amplitude is similar to the IEEE Digital Signal Processing design package, Program 5.1, written by J. McClellan, T. Parks, and L. Rabiner, Programs for Digital Signal Processing, (1979). Note that the desired transform D(k) is an even function in k and the number of coefficients N is odd.

The attached software microfiche discloses the source code for implementing subprocesses in accordance with the present invention. Software is source code similar to the IEEE Digital Signal Processing design package, Program 5.1, adapted to overcome the problems noted in section 1.3. Software is source code for performing the automated filter design illustrated in FIG. 4 and discussed in section 2.

The microfiche software of this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

IV. Parallel Computer Implementation

Figure 6:
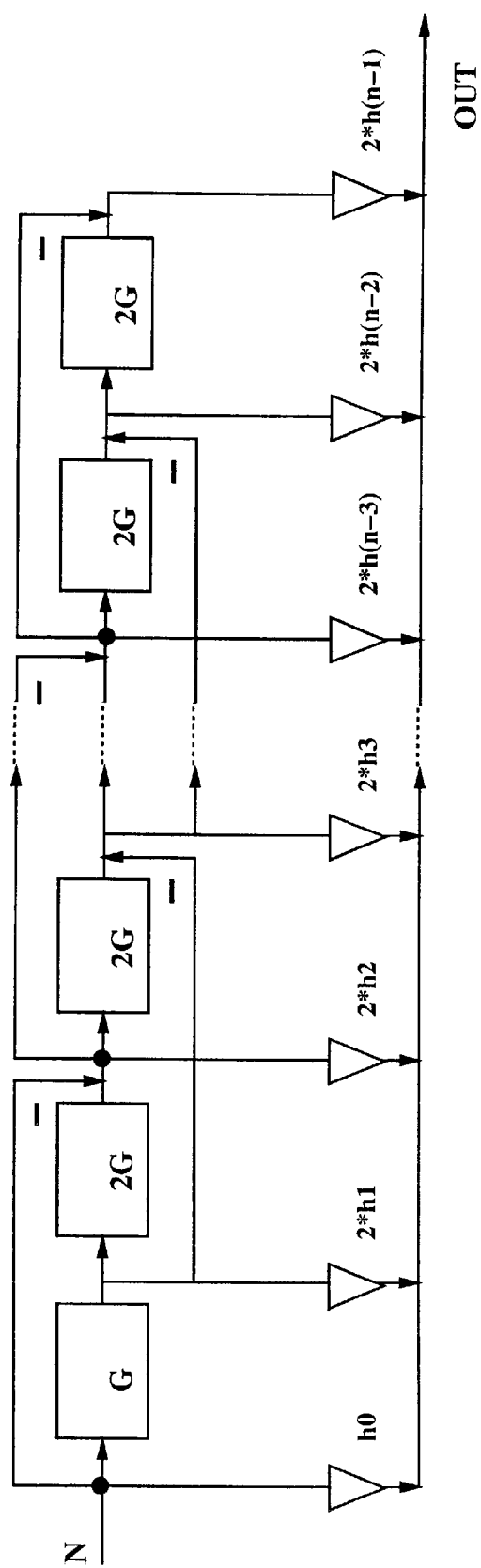
FIG. 6 is a diagram illustrating the 2D Chebyshev recursive filter structure.

Pieprzak and Highnam in U.S. patent application Ser. Nos. 07/811,414, abandoned, and 07/811,565 U.S. Pat. No. 5,349,527, describe depth migration on the CM-2 parallel processor computer. The depth migration of the present invention can be implemented on practically any multiprocessor parallel computer architecture. However the CM-5 computer made by Thinking Machines is preferred. See, Thinking Machines Corporation, 1993. *The Connection Machine CM-5 Technical Summary*. Such a processor is an attractive platform upon which to execute migration programs, because its performance scales up as its size increases; thus, the system can grow incrementally as the computation demand of the processing organization increases. See also, W. Daniel Hillis and Lewis W. Tucker, The CM-5 Connection Machine: A Scalable Supercomputer, *Communications of the ACM*, November 1993, Vol. 36, No. 11, pp 31–40. Pieprzak and Highnam describe the preferred embodiment of depth migration using a "least squares" method for extrapolation filter derivation. The migration method uses a process to build the desired large filter using recursive Chebyshev filter structure for 2D convolution with radially symmetric operators. FIG. 6 illustrates this recursive Chebyshev structure.

Using this scheme, the large filter can be expressed as a sum of small, fixed size, convolution filters along with additions. Because these small symmetric convolutions are identical over an entire frequency plane, intermingled with scalar complex multiplications, significant computational savings are realized.

FIG. 7 illustrates the 5×5 G operator used in the filter of FIG. 6. In the G operator of FIG. 7 the c constant can vary as a function of frequency with little additional computational cost. In the preferred embodiment, G is fixed and used for all frequencies. While different sized operators G might be used, the 5×5 operator of FIG. 7 is believed well suited for most problems. A fixed value of c=0.0255 has proven useful.

A simple outline of the depth migration method is:
1. Initialization
2. For each frequency:
   A. Initialization for one frequency
   B. For each depth
      i. Compute velocity
      ii. Extrapolate
      iii. Update depth map Initialization includes procedures such as converting the seismic data to the space-frequency domain and storing the space-frequency data cube in the remote memory, such as the disk array or Data Vault in a CM-2 or CM-5 computer. Additionally, a velocity model is stored in the remote memory.

Figure 8:
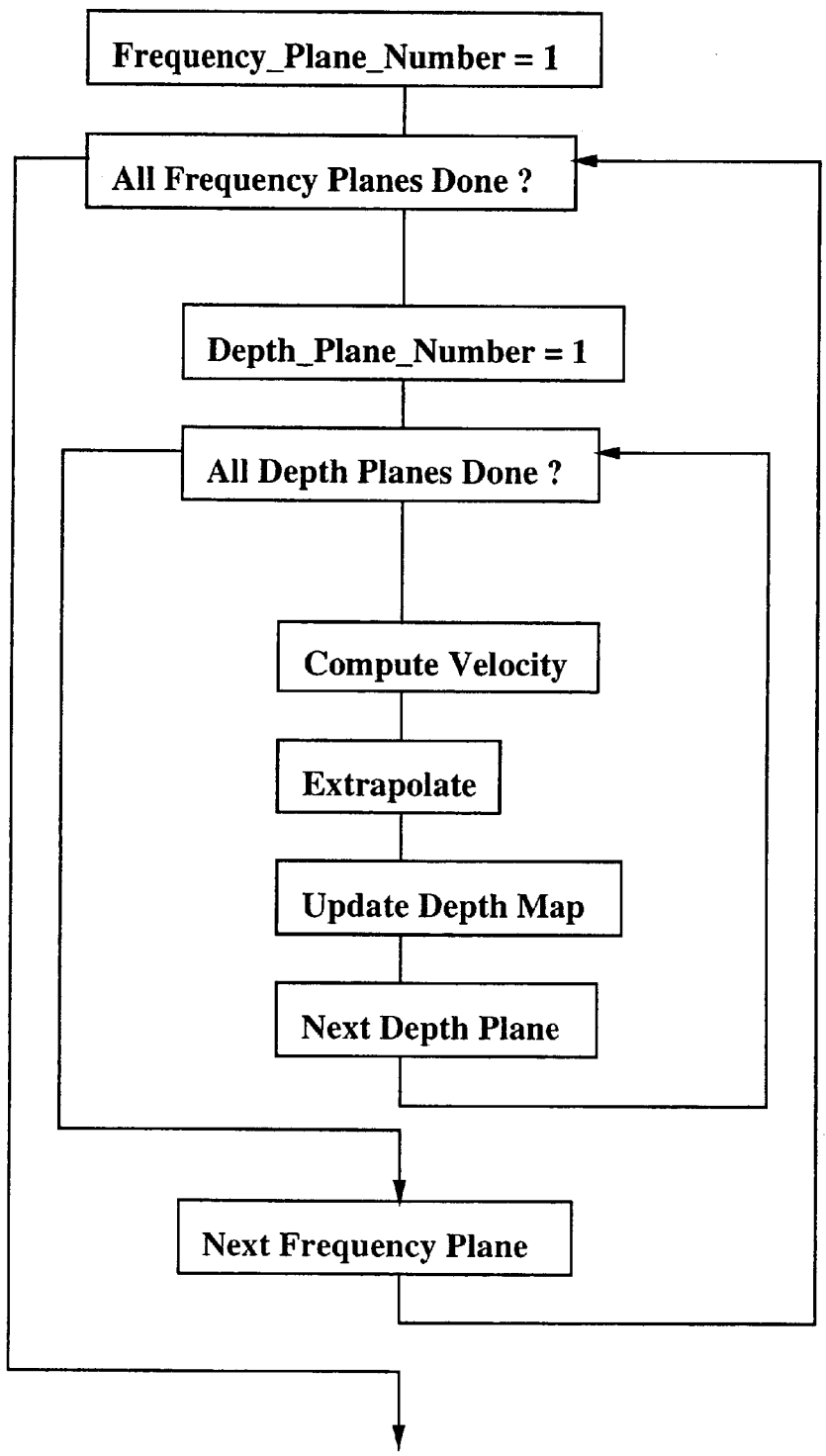
FIG. 8 is a flowchart depicting the depth migration of the present invention.

FIG. 8 illustrates schematically a flowchart for the downward continuation. As can be seen in FIG. 8, for a single frequency plane, the data is downwardly continued (extrapolated) for all depth planes of interest.

As shown in FIG. 8, after computing a velocity map for the depth of interest, the filter coefficients are determined independently for each spatial position (x,y) in the (x,y) plane. To accomplish this, a processing component is assigned to the subgrids in the (x,y) plane. Each subgrid contains one or more (x,y) spatial positions with the subgrids migrated concurrently in parallel by the respective processing component.

The reduced set of filter coefficients determined by the method of the present invention (used as $h_n$ in the filter of FIG. 6) is stored as a table in local memory. This reduced table of filter coefficients is stored redundantly in the local memory of every processing component allocated to migration to increase efficiency. That is, one filter coefficient table is stored in the local memory of each processing group.

The filter coefficients are retrieved from the coefficient table by indexing with the normalized frequency $$\frac{\omega \Delta x}{v}.$$

The normalized frequency is a function of frequency $\omega$ and velocity v ($\Delta x$ is usually constant); hence the velocity map for the depth plane of interest is critical. Each processing component can access the coefficient table with a different normalized frequency value to retrieve a distinct set of filter coefficients $h_n$ for each (x,y) position. In the preferred embodiment each set of filter coefficients comprises 21 coefficients $h_n$. Therefore, a distinct extrapolation operator is computed for each (x,y) point by the filter of FIG. 6 at a very low cost computation for each depth and frequency. The result is an extrapolated plane of depth shifted (x,y) spatial positions.

The depth map for each frequency (x,y,d) is held in the remote memory. As can be seen in FIG. 8, after extrapolation for a particular depth the result is used to update the depth maps. This is accomplished by entering the depth map held in remote memory and adding the real components of the current frequency to the map for the particular depth.

As shown in FIG. 8, a single frequency for all depths of interest is downward continued or extrapolated. After all depths for a single frequency have been downward continued, the next frequency plane is entered and the process repeated for all frequency planes of interest.

We claim:

1. A method of migrating seismic data using a parallel computer having a number of processing components each with local memory, where the seismic data is downwardly continued in the frequency domain for all depths of interest, the method comprising the steps of:
   i) assigning processing components to respective subgrids in the x,y depth plane;
   ii) determining a table of extrapolation filters which varies according to lateral (x,y) velocity variations by approximating the extrapolation filters using a Remez-type approximation with an error less than a certain amount;
   iii) loading said table into local memory of each processing component;
   iv) operating said processing components independently to extrapolate the seismic data for an x,y depth plane, each processing component accessing its table in local memory according to the velocity in its assigned subgrid.

2. The method of claim 1, said determining step ii) including the substeps of setting a desired maximum dip angle and selecting a wavenumber frequency transition zone.

3. The method of claim 1, said determining step ii) including selecting a frequency transition zone in which the amplitude is monotonically decreasing.

4. The method of claim 1, said table comprising a one dimensional array indexed by normalized frequency $$\frac{\omega \Delta x}{v}.$$

5. The method of claim 1, said extrapolation filters each comprising N filter coefficients $h_n$.

6. The method of claim 1, including repeating the step of operating said processing components independently to extrapolate successive (x,y) depth planes.

7. The method of claim 1, wherein said processing components are assigned to the same spatial subgrid in each (x,y) depth plane.

8. The method of claim 1, said operating step iv) comprising convolving the McClellan transform of the filter for its assigned subgrid with the seismic data.

9. The method of claim 6, including performing steps i–iv for a single frequency plane and repeating for successive frequency planes.

10. A method of seismic wavefield depth extrapolation comprising the steps of:

i) approximating the complex 1D depth extrapolation operator D(k) with an ordinary Fourier cosine series having N coefficients $h_n$;
ii) setting a desired maximum migration dip angle θ and desired N;
iii) computing a table of extrapolation filters $h_n$ for a range of normalized frequencies $$\frac{\omega \Delta x}{v},$$

where
for a given normalized frequency $$\frac{\omega \Delta x}{v},$$

define a frequency transition band width and
determine the N coefficients $h_n$ for the given normalized frequency $$\frac{\omega \Delta x}{v}$$

using a Remez-type approximation where the amplitude is monotonically decreasing in the transition band;
iv) extrapolating a seismic wavefield for a lateral region at a given depth using the N filter coefficients $h_n$ from said table corresponding to the normalized frequency for the lateral region.

11. The method of claim 10, where said extrapolation step iv) determines the N filter coefficients $h_n$ by linear interpolation between the nearest normalized frequency values in the table.

12. The method of claim 10, where the maximum amplitude is less than a certain amount.

13. The method of claim 10, where the maximum amplitude in the transition band and pass band is less than 1.001.

14. The method of claim 10, including the step of increasing the width of the transition band provided the amplitude in the pass and transition bands does not exceed a certain amount.

15. The method of claim 10, the setting a desired N substep including the substep of decreasing the number N provided the amplitude in the transition band decreases monotonically.

16. The method of claim 10, the setting a desired dip angle θ step ii) including the substep of decreasing the maximum dip angle θ provided the amplitude in the pass and transition bands do not exceed a specified amount.

17. A method of migrating seismic data, for converting stacked seismic data into a geologic image, using a parallel computer having a number of processing components, each with local memory, where the seismic data is downwardly continued in the frequency domain for all depth planes of interest, including the steps of:
   i) assigning processing components to respective lateral subgrids of seismic data in x,y depth plane;
   ii) determining a table of extrapolation filters which varies according to lateral (x,y) subgrids of seismic data by approximatingthe extrapolation filters using a Remez-type approximation with an error less than a certain amount;
   iii) loading said table into local memory of each processing component; and iv) operating said processing components independently to extrapolate the seismic data for the x,y depth plane, each processing component accessing its table in local memory according to the subsurface acoustic velocity in its assigned subgrid.

18. The method of claim 17, said determining step ii) including the substeps of setting a desired maximum dip angle and selecting a wavenumber frequency transition zone.

19. The method of claim 17, said determining step ii) including selecting frequency transition zone in which the amplitude is monotonically decreasing.

20. The method of claim 17, said table comprising a one dimensional array indexed by normalized frequency $$\frac{\omega \Delta x}{v}.$$

21. The method of claim 17, said extrapolation filters each comprising N filter coefficients $h_n$.

22. The method of claim 17, including repeating the step of operating said processing components independently to extrapolate successive (x,y) depth planes.

23. The method of claim 17, wherein said processing components are assigned to the same spatial subgrid in each (x,y) depth plane.

24. The method of claim 17, said operating iv) comprising convolving the McClellan transform of the filter for its assigned subgrid with the seismic data.

25. The method of claim 22, including performing steps i–iv) for a single frequency plane and repeating for successive frequency planes.

26. A parallel computer-implemented method of seismic wavefield depth extrapolation, in furtherance of transforming stacked seismic data into a geologic image, comprising the steps of:

i) approximating the complex ID depth extrapolation operator D(k) with an ordinary Fourier cosine having N coefficients $h_n$;

ii) setting a desired maximum migration dip angle Ø and desired N;

iii) computing a table of extrapolation filters $h_n$ for a range of normalized frequencies $$\frac{\omega \Delta x}{v},$$

where
for a given normalized frequency $$\frac{\omega \Delta x}{v},$$

define a frequency transition bandwidth and
determine the N coefficients $h_n$ for the given normalized frequency $$\frac{\omega \Delta x}{v}$$

using a Remez-type approximation where the amplitude is monotonically decreasing in the transition band;

iv) extrapolating a seismic wavefield for a lateral region at a given depth using the N filter coefficients $h_n$ from said table corresponding to the normalized frequency for the lateral region.

27. The method of claim 26, where said extrapolation step iv) determines the N filter coefficients $h_n$ by linear interpolation between the nearest normalized frequency values in the table.

28. The method of claim 26, where the maximum amplitude is less than a certain amount.

29. The method of claim 26, wherein the maximum amplitude in the transition band and pass band is less than 1.001.

30. The method of claim 26, including the step of increasing the width of the transition band provided the amplitude in the pass and transition bands does not exceed a certain amount.

31. The method of claim 26, the setting a desired B substep including the substep of decreasing the number N provided the amplitude in the transition band decreases monotonically.

32. The method of claim 26, the setting a desired dip angle θ step ii) including the substep of decreasing the maximum dip angle θ provided the amplitude in the pass and transition bands do not exceed a specified amount.

33. A parallel computer programmed for seismic migration to transform stacked seismic data into a geologic image where the seismic data is downwardly continued in the frequency domain for a number x,y planes of seismic data in an x,y depth plane;

memory associated with each processing component having loaded therein a table of extrapolation filters which vary according to lateral (x,y) subsurface acoustic velocity variations in a depth plane by approximating the extrapolation filters using a Remez-type approximation with an error less than a certain amount;

means for operating said processing components independently to extrapolate the seismic data for the x,y depth plane, each processing component accessing its table in memory according to the velocity in its assigned subgrid.

34. The computer of claim 33, where the memory comprises a local memory for each processing component with each local memory loaded with said table.

35. The computer of claim 33, where said operating emans functions to operate said processing components independently to extrapolate other x,y depth planes.

36. The computer of claim 33, said table of extrapolation filters comprising N filter coefficients $h_n$ for a range of normalized frequencies $$\frac{\omega \Delta x}{v}.$$

37. A method of acquiring and processing seismic data comprising the steps of:

i) acquiring seismic data;
ii) applying quality control, filtering and deconvulation on a trace basis to the seismic data;
iii) estimating the velocity of the subsurface formations;
iv) performing D dip moveout correction and stacking to the seismic data; and
v) migrating the seismic data, using a parallel computer having a number of processing components, each with local memory, where the seismic data is downwardly continued in the frequency domain for all depth planes of interest, such that a map of formation locations is created, including the steps of:
a) assigning processing components to respective lateral subgrids of seismic data in an x,y depth plane;

b) determining a table of extrapolation filters which varies according to lateral (x,y) subgrids of seismic data by approximating the extrapolation filters using a Remez-type approximation with an error less than a certain amount;
c) loading the table into local memory of each processing component; and
d) operating the processing components independently to extrapolate the seismic data for the x,y depth plane, each processing component accessing its table in local memory according to the subsurface acoustic velocity in its assigned subgrid.

38. The method of claim 37 wherein:

the determining step (v)(b) includes the substeps of setting a desired maximum dip angle and selecting a wavenumber frequency transition zone.

* * * * *